United States Patent
Kim et al.

(10) Patent No.: US 12,018,339 B2
(45) Date of Patent: Jun. 25, 2024

(54) RECYCLED LEATHER, AND APPARATUS FOR DRY-MANUFACTURING RECYCLED LEATHER

(71) Applicant: ATKO PLANNING INC., Paju-si (KR)

(72) Inventors: Ji Eon Kim, Seoul (KR); Bong Jin Choe, Gwangju-si (KR); Byung Ho Choo, Paju-si (KR)

(73) Assignee: ATKO PLANNING INC., Paju-si (KR)

( * ) Notice: Subject to any disclaimer, the term of this patent is extended or adjusted under 35 U.S.C. 154(b) by 534 days.

(21) Appl. No.: 17/291,519

(22) PCT Filed: May 20, 2019

(86) PCT No.: PCT/KR2019/005988
§ 371 (c)(1),
(2) Date: Jun. 3, 2021

(87) PCT Pub. No.: WO2020/096149
PCT Pub. Date: May 14, 2020

(65) Prior Publication Data
US 2022/0002825 A1    Jan. 6, 2022

(30) Foreign Application Priority Data

Nov. 5, 2018 (KR) .................. 10-2018-0134450

(51) Int. Cl.
*C14B 7/04* (2006.01)
*B29C 43/00* (2006.01)
(Continued)

(52) U.S. Cl.
CPC ............. *C14B 7/04* (2013.01); *B29C 43/006* (2013.01); *C14B 13/00* (2013.01); *D04H 1/492* (2013.01); *D04H 1/732* (2013.01)

(58) Field of Classification Search
CPC .. C14B 13/00; C14B 1/58; C14B 3/00; C14B 7/04; C14B 7/00; D04H 1/732;
(Continued)

(56) References Cited

U.S. PATENT DOCUMENTS 3,179,342 A * 4/1965 Young .................... D21H 13/34
                                                           241/4
3,505,161 A * 4/1970 Koller, Jr. ............ D06N 3/0061
                                                         428/903.3

(Continued)

FOREIGN PATENT DOCUMENTS

EP          3878981 A1 * 9/2021 ............... C14B 1/10
KR   10-2001-0104998 A    11/2001
(Continued)

OTHER PUBLICATIONS

Machine Translation of KR 10-1752176 A1. (Year: 2017).*
Brydon et al., in "Drylaid web formation," Chapter 4 of Handbook of Nonwoven, pp. 89-180. (Year: 2022).*

*Primary Examiner* — Jose A Fortuna
(74) *Attorney, Agent, or Firm* — Bridgeway IP Law Group, PLLC; Jihun Kim

(57) ABSTRACT

An apparatus for dry-manufacturing recycled leather comprises air-laid material; and recycled leather manufactured using the apparatus for dry-manufacturing recycled leather. The apparatus for dry-manufacturing recycled leather molds leather fibers and general fibers, which are mixed using air-laid material, and thus a conventional carding process is not required, and recycled leather manufactured thereby has a high tensile strength.

12 Claims, 3 Drawing Sheets

(51) Int. Cl.
  *C14B 13/00* (2006.01)
  *D04H 1/492* (2012.01)
  *D04H 1/732* (2012.01)

(58) Field of Classification Search
  CPC .... D04H 1/492; D04H 1/4266; D04H 1/4274; B29C 70/502; B29C 43/006; B02C 18/0084; D21H 27/42; Y10S 264/913; B27N 3/04
  See application file for complete search history.

(56) References Cited

U.S. PATENT DOCUMENTS

| | | | |
|---|---|---|---|
| 6,264,879 B1 * | 7/2001 | Addie | C14B 7/00 |
| | | | 264/913 |
| 9,822,481 B2 * | 11/2017 | Pourdeyhimi | D04H 1/542 |
| 10,612,103 B2 * | 4/2020 | Kim | C14B 7/02 |
| 10,822,667 B2 * | 11/2020 | Kim | B32B 5/02 |
| 11,219,903 B2 * | 1/2022 | Kim | C14B 13/00 |
| 2008/0010794 A1 * | 1/2008 | Bevan | B32B 29/02 |
| | | | 28/103 |
| 2009/0291250 A1 | 11/2009 | Ichihashi et al. | |
| 2013/0022776 A1 * | 1/2013 | Nakayama | D06M 15/564 |
| | | | 428/151 |
| 2015/0292148 A1 * | 10/2015 | Pourdeyhimi | D04H 1/492 |
| | | | 28/112 |
| 2018/0094329 A1 * | 4/2018 | Kim | C14B 7/02 |
| 2022/0002825 A1 * | 1/2022 | Kim | D04H 1/4266 |
| 2022/0213621 A1 * | 7/2022 | Kim | D02G 3/10 |
| 2023/0193523 A1 * | 6/2023 | Kim | C14B 7/00 |
| | | | 66/202 |

FOREIGN PATENT DOCUMENTS

| | | | |
|---|---|---|---|
| KR | 10-1022838 B1 | 3/2011 | |
| KR | 10-2014-0105615 A | 9/2014 | |
| KR | 10-1752176 B1 | 7/2017 | |
| WO | WO-2020096149 A1 * | 5/2020 | ............... C14B 1/10 |

* cited by examiner

RECYCLED LEATHER, AND APPARATUS FOR DRY-MANUFACTURING RECYCLED LEATHER

TECHNICAL FIELD

The present invention relates to a dry manufacturing apparatus for recycled leather that is provided with an airlaid machine(s), a dry manufacturing method for recycled leather, and recycled leather manufactured using the dry manufacturing method.

BACKGROUND ART

Natural leather is made of hard skin of animals, and according to excellent physical properties thereof, the natural leather is widely used in the industrial fields of manufacturing various products like bags, shoes, furniture, and so on. The natural leather is separated from the animal body and then made into a product through chemical and physical processes, and among the processes, in this case, a cutting process is necessarily carried out according to the desired design of the product. Through the cutting process, however, a large amount of leather waste is produced, and most of leather waste is burnt or buried, thereby undesirably causing serious environmental problems.

So as to recycle the leather waste to be burnt or buried, many studies have been made, and to do this, accordingly, a new technology, in which leather waste is crushed into fibers and the fibers are then mixed with synthetic resin based adhesives to manufacture man-made leather, has been developed. A conventional technology related thereto is disclosed in Korean Patent No. 10-1022828 (entitled 'Dry manufacturing method and system for synthetic leather and dry synthetic leather manufactured using the same and issued on Mar. 9, 2011).

According to the conventional technology in which the leather waste is crushed into fibers and the fibers are then mixed with synthetic resin based adhesives to manufacture man-made leather, however, toxic gas is produced in the steps of hardening, heating and rolling the synthetic resin adhesives, thereby still causing environmental pollution.

Accordingly, there is a need for development of a method for manufacturing a recycled leather sheet so that environmental pollution can be minimized, and so as to solve the conventional problems, the present inventors have developed a method for manufacturing a recycled leather sheet, through which environmental pollution can be minimized, as filed (which is disclosed in Korean Patent No. 10-1752176).

However, the recycled leather sheet manufactured according to the conventional method has high elongation because it has textures generated by carding, so that it may be elongated well, and besides, the recycled leather sheet has weak bonding among fibers to cause a tensile strength or tear strength to be low.

Accordingly, the present inventors have made many studies so as to solve the above problems and as a result, they have found that if the recycled leather is manufactured by replacing carding with airlaid processes, the recycled leather has low elongation because it has no textures and further has strong bonding among fibers to ensure a high tensile strength or tear strength.

DISCLOSURE

Technical Problem

It is an object of the present invention to provide recycled leather.

It is another object of the present invention to provide a dry manufacturing apparatus for recycled leather that is provided with an airlaid machine(s).

It is still another object of the present invention to provide a dry manufacturing method for recycled leather that is carried out by using airlaid processes.

The technical problems to be achieved through the present invention are not limited as mentioned above, and other technical problems not mentioned herein will be obviously understood by one of ordinary skill in the art through the following description.

Technical Solution

To accomplish the above-mentioned objects, according to one aspect of the present invention, there is provided a dry manufacturing apparatus for recycled leather, including: a leather fiber separation unit for separating leather fibers from leather waste; a blending unit for blending the separated leather fibers with general fibers; and a molding unit for molding the blended leather fibers and general fibers to the recycled leather, wherein the molding unit has an airlaid machine(s) for molding the blended leather fibers and general fibers.

The leather fiber separation unit includes: a leather crushing machine for breaking bonding among the leather fibers of the leather waste; and a leather scutching machine for separating the leather fibers from the leather waste in which the bonding among the leather fibers is broken.

The blending unit includes: a leather fiber injection machine for injecting the leather fibers; a general fiber injection machine for injecting the general fibers; a leather fiber weight measuring machine for measuring the weight of the leather fibers injected through the leather fiber injection machine; a general fiber weight measuring machine for measuring the weight of the general fibers injected through the general fiber injection machine; and a blending machine(s) for blending the leather fibers and the general fibers, and the leather fiber weight measuring machine is connected to the general fiber weight measuring machine by means of a conveyor belt, so that the general fibers are injected by a given weight with respect to the weight of the leather fibers measured through the leather fiber weight measuring machine into the general fiber weight measuring machine through the general fiber injection machine, and the leather fibers injected into the leather fiber weight measuring machine are moved to the general fiber weight measuring machine through the conveyor belt and blended with the general fibers injected through the general fiber injection machine.

The general fibers injected into the general fiber weight measuring machine are present in an amount within the range of 5 to 40 parts by weight with respect to 100 parts by weight of the leather fibers injected into the leather fiber weight measuring machine.

The blending machines include a first blending machine and a second blending machine(s), the first blending machine serving to blend the leather fibers with the general fibers through a mixer and the second blending machine(s) having a fine opener(s) serving to blow air thereinto to blend the leather fibers with the general fibers, so that the leather fibers and general fibers blended through the first blending machine are consistently blended through the second blending machine(s).

The second blending machine(s) has plural fine openers, so that 30 to 70% of the leather fibers and the general fibers are blended in the first blending machine and 90 to 100% of the leather fibers and the general fibers are blended in the second blending machine(s).

The airlaid machines are plurally provided so that the blended leather fibers and general fibers are fed to upper portions of the airlaid machines and then molded on the lower portions of the airlaid machines.

The airlaid machines each include rollers, an air supplier, and/or a mixer.

The drop speeds of the leather fibers and the general fibers to the lower portions of the airlaid machines from the upper portions thereof are in the range of 10 to 500 m/min.

The molded leather fibers and general fibers discharged from the lower portions of the airlaid machines are stacked on conveyor belts, the conveyor belts being connected to each other, so that the molded leather fibers and general fibers discharged from any one of the airlaid machines are moved sequentially to the other airlaid machine through the conveyor belts, and the moved leather fibers and general fibers are stacked sequentially onto the molded leather fibers and general fibers discharged from the other airlaid machine.

The dry manufacturing apparatus further includes a press machine adapted to compress the molded recycled leather, together with heat.

The recycled leather is manufactured without water.

To accomplish the above-mentioned objects, according to another aspect of the present invention, there is provided a dry manufacturing method for recycled leather, including the steps of: separating leather fibers from leather waste; blending the separated leather fibers with general fibers; and molding the blended leather fibers and general fibers to the recycled leather, wherein the molding step is carried out to mold the blended leather fibers and general fibers by using an airlaid machine(s).

To accomplish the above-mentioned objects, according to still another aspect of the present invention, there is provided recycled leather manufactured by the dry manufacturing method as mentioned above.

The recycled leather has elongation of 20 to 80%.

The recycled leather has a tensile strength of 5 to 20 N/mm$^2$.

Advantageous Effects

According to the present invention, the dry manufacturing apparatus for recycled leather can mold the blended leather fibers and general fibers by using the airlaid machines, thereby requiring no conventional carding. Further, the recycled leather molded through the airlaid machines does not have any textures because no carding is applied, and accordingly, the recycled leather with low elongation does not stretch well, so that it has the inherent properties hard leather has.

In addition, the dry manufacturing apparatus for recycled leather is provided with the plurality of airlaid machines, so that the molded leather fibers and general fibers are stacked on another molded leather fibers and general fibers, and through strong bonding among the fibers, further, a bonding force between the layers becomes increased, thereby enhancing the tensile strength or tear strength of the recycled leather manufactured.

Moreover, the dry manufacturing apparatus for recycled leather can manufacture the recycled leather in a dry manner, without using any water, unlike the conventional recycled leather manufacturing apparatus using a very large amount of water, thereby achieving the reduction of manufacturing cost.

The effects of the invention are not limited as mentioned above, and it should be understood that the effects of the invention include all effects inferable from the detailed description and claims of the present invention.

BEST MODE FOR INVENTION

Hereinafter, embodiments of the present invention as will be discussed later will be in detail described so that they may be carried out easily by those having ordinary skill in the art. Of course, it is to be understood that the disclosed embodiments are merely exemplary of the invention, which can be embodied in various forms.

Embodiment: Manufacturing Recycled Leather

Bonding among leather fibers of leather waste was broken by using a leather crushing machine, and leather fibers with the length of 2.7 cm were separated from the crushed leather fibers by using a leather scutching machine. The separated leather fibers were primarily stirred with 150 g of polyester fibers and were then blended with the polyester fibers two times in a fine opener. The blended leather fibers were injected and molded in airlaid machines, and after the molded leather fibers passed through a pre-heater, a press machine, a cooler, a calendar machine, a buffing machine, and a winder, they were made into recycled leather.

EXAMPLE 1

Observing Cross Section of Recycled Leather

Figure 3:
FIG. 3 is a photograph showing top of recycled leather according to the present invention.
Figure 4:
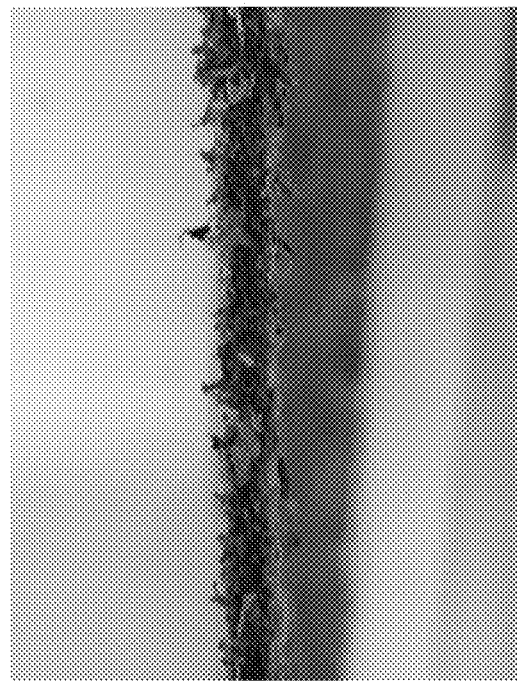
FIG. 4 is a photograph showing a cross section of the recycled leather according to the present invention.

Photographs for top and cross section of the recycled leather manufactured in the embodiment as mentioned above are shown in FIGS. 3 and 4. As shown in FIGS. 3 and 4, it can be checked that the recycled leather has layers and there is no texture on the recycled leather.

EXAMPLE 2

Measuring Tensile Strength of Recycled Leather

Tensile strength and tear strength of the recycled leather manufactured in the embodiment as mentioned above were measured by using equipment of Korea Apparel Testing and Research Institute (KATRI), and the measured results are suggested in Table 1.

TABLE 1

| Test | requirement | Test results |
| --- | --- | --- |
| Tear strength(ST-02) | 30N | Length of 114.8 N/mm<br>Width of 94.1 N/mm |
| Tensile strength(ST-03) | Min 11 MPa | Length of 14.6 N/mm$^2$<br>Width of 19.3 N/mm$^2$ |

As appreciated from Table 1, the recycled leather according to the embodiment of the present invention has the tear strength of about 100 N/mm and the tensile strength of about 17 N/mm$^2$, so that it can be found that the recycled leather has the properties of hard leather.

EXPLANATIONS ON REFERENCE NUMERALS IN THE DRAWINGS

101: dry manufacturing apparatus for recycled leather
110: leather fiber separation unit
120: leather crushing machine
140: leather scutching machine
200: blending unit
210: leather fiber injection machine
220: general fiber injection machine
230: first blending machine
240, 250: second blending machine
300: molding unit
320, 340: airlaid machine
400: post-processing unit
410: pre-heater
420: press machine
430: cooler
440: calendar machine
450: buffing machine
460: winder

MODE FOR INVENTION

Hereinafter, the embodiments of the present invention will be in specific explained. However, they are not intended to be exhaustive or to limit the invention to the precise forms disclosed, and it is therefore intended that the scope of the invention be limited not by this detailed description, but rather by the claims appended hereto.

Further, terms used in this application are used to only describe specific exemplary embodiments and are not intended to restrict the present invention. An expression referencing a singular value additionally refers to a corresponding expression of the plural number, unless explicitly limited otherwise by the context. In the description, when it is said that one portion is described as "includes" any component, one element further may include other components unless no specific description is suggested.

According to a first aspect of the present invention, there is provided a dry manufacturing apparatus for recycled leather that includes: a leather fiber separation unit for separating leather fibers from leather waste; a blending unit for blending the separated leather fibers with general fibers; and a molding unit for molding the blended leather fibers and general fibers to the recycled leather, wherein the molding unit has an airlaid machine(s) for molding the blended leather fibers and general fibers.

Now, the dry manufacturing apparatus for recycled leather according to the first aspect of the present invention will be in detail explained with reference to FIGS. 1 and 2.

In an embodiment of the present invention, a dry manufacturing apparatus 101 for recycled leather includes a leather fiber separation unit 110 for separating leather fibers from leather waste. The leather fiber separation unit 110 serves to separate only leather fibers from leather waste and to do this, the leather fiber separation unit 110 includes a leather crushing machine 120 for breaking bonding among the leather fibers of the leather waste and a leather scutching machine 140 for separating the leather fibers from the leather waste in which the bonding among the leather fibers is broken.

In an embodiment of the present invention, the leather crushing machine 120 may crush the leather waste to break bonding among the leather fibers of the leather waste. In this case, the crushing is carried out by using a known crushing method, but of course, a crushing method capable of breaking bonding among the leather fibers of the leather waste has to be adopted.

In an embodiment of the present invention, the scutching machine 140 serves to separate the leather fibers from the leather waste in which the bonding among the leather fibers is broken. For example, the separation is carried out by using heavy weights of the leather fibers.

In an embodiment of the present invention, the dry manufacturing apparatus 101 for recycled leather includes a blending unit 200 for blending the separated leather fibers with general fibers. The blending unit 200 serves to blend the separated leather fibers with general fibers so as to manufacture the recycled leather. In this case, the general fibers are filaments or staple fibers. If the general fibers are filaments, the manufactured recycled leather has strong durability, and if the general fibers are staple fibers, the manufactured recycled leather becomes soft.

In an embodiment of the present invention, the general fibers are fibers selected from the group consisting of natural cellulose fibers, natural protein fibers, mineral fibers, artificial cellulose fibers, artificial protein fibers, rubber fibers, inorganic fibers, acetate fibers, polyamide fibers, polyester fibers, polyurethane fibers, polyurea fibers, polyacrylic fibers, polyvinyl alcohol fibers, polyvinyl chloride fibers, polypropylene fibers, polyethylene fibers, polystyrene fibers, polyfluoro ethylene fibers, and combinations thereof.

In an embodiment of the present invention, the general fibers are fibers selected from the group consisting of kapok, linen, ramie, hemp, jute, manila, abaca, sisal linen, coir, wool, goat hair, cashmere wool, camel wool, alpaca wool, rabbit hair, vicuna wool, lama wool, cultivated silk, tussah silk, asbestors, metal fibers, glass fibers, rock fibers, slag fibers, carbon fibers, rayon, lanital, soybean protein fibers, groundnut fibers, corn protein fibers, casein fibers, acetate, acetylated acetate fibers, chlorinated rubber, hydrochlorinated rubber, nylon, amilan, rilsan, perlon L, terylene, tetron, dacron, kodel, vycron, spandex, lycra, vyrene, perlon U, urilon, yurilon, orlon, acrilan, creslan, exlan, vonnel, cashmilon, verel, dynel, kanekalon, vinylon, vinyon, teviron, peche, saran, kurehalon, herculon, pyrene, revon, hizex, alkyl, sialon, teflon, and combinations thereof.

In an embodiment of the present invention, an anti-static agent and/or oils and fats are added to allow the blending to be more gently carried out. Only if the anti-static agent serves to perform an anti-static function, it is not limited particularly in kind thereof, and the oils and fats may be freely selected from animal and vegetable oils and fats.

In an embodiment of the present invention, the blending unit 200 includes: a leather fiber injection machine 210 for injecting the leather fibers; a general fiber injection machine 220 for injecting the general fibers; a leather fiber weight measuring machine (not shown) for measuring the weight of the leather fibers injected through the leather fiber injection machine 210; a general fiber weight measuring machine (not shown) for measuring the weight of the general fibers injected through the general fiber injection machine 220; and a blending machine(s) for blending the leather fibers and the general fibers.

In an embodiment of the present invention, the leather fiber weight measuring machine is connected to the general fiber weight measuring machine by means of a conveyor belt, and accordingly, the general fibers are injected by a given weight with respect to the weight of the leather fibers measured through the leather fiber weight measuring machine into the general fiber weight measuring machine through the general fiber injection machine 220. The leather fibers injected into the leather fiber weight measuring machine are moved to the general fiber weight measuring machine through the conveyor belt and thus blended with the general fibers injected through the general fiber injection machine 220. Before the leather fibers injected into the leather fiber weight measuring machine are moved to the general fiber weight measuring machine through the conveyor belt, that is, the general fibers are not injected. Further, the leather fibers and the general fibers may be each injected onto the conveyor belt, and the weights of the leather fibers and the general fibers may be measured through the weight measuring machines connected to the conveyor belt.

In an embodiment of the present invention, the general fibers injected into the general fiber weight measuring machine are present in an amount within the range of 5 to 40 parts by weight, desirably within the range of 10 to 30 parts by weight, with respect to 100 parts by weight of the leather fibers injected into the leather fiber weight measuring machine. If the content of the general fibers is less than 5 parts by weight with respect to 100 parts by weight of the leather fibers, the general fibers are not blended well with the leather fibers due to a small amount thereof, and contrarily, if the content of the general fibers is greater than 40 parts by weight with respect to 100 parts by weight of the leather fibers, the recycled leather manufactured cannot exhibit leather textures well due to a large amount thereof.

In an embodiment of the present invention, the blending machines include a first blending machine 230 and second blending machines 240 and 250. The first blending machine 230 serves to blend the leather fibers with the general fibers through a mixer, and the second blending machines 240 and 250 include fine openers serving to blow air thereinto to blend the leather fibers with the general fibers. The leather fibers and general fibers blended through the first blending machine 230 are consistently blended through the second blending machines 240 and 250. That is, as shown in FIGS. 1 and 2, the leather fibers and general fibers primarily blended through the first blending machine 230 are transferred to the second blending machines 240 and 250 connected to the first blending machine 230 and then blended with one another. In this case, the first blending machine 230 serves to blend the leather fibers and the general fibers through the general mixer. Further, the fine openers of the second blending machines 240 and 250 blow the air from the bottom thereof, and through the air blown, the leather fibers and the general fibers are blown and mixed with one another through the fine openers.

In an embodiment of the present invention, the fine openers of the second blending machines 240 and 250 are provided plurally. First, 30 to 70% of the leather fibers and general fibers are blended in the first blending machine 230, and next, 90 to 100% of the leather fibers and general fibers are blended in the second blending machines 240 and 250. That is, as shown in FIGS. 1 and 2, the two second blending machines 240 and 250 are provided, and in this case, each second blending machine is provided with the fine opener. If there are the two second blending machines 240 and 250, the leather fibers and general fibers blended in the second blending machine 240 are transferred directly to the molding unit 300, and otherwise, after they are blended one more time in the other second blending machine 250, they are transferred to the molding unit 300.

In an embodiment of the present invention, the dry manufacturing apparatus 101 for recycled leather includes: the molding unit 300 for molding the blended leather fibers and general fibers to the recycled leather. The molding unit 300 has airlaid machines 320 and 340 for molding the blended leather fibers and general fibers.

Figure 1:
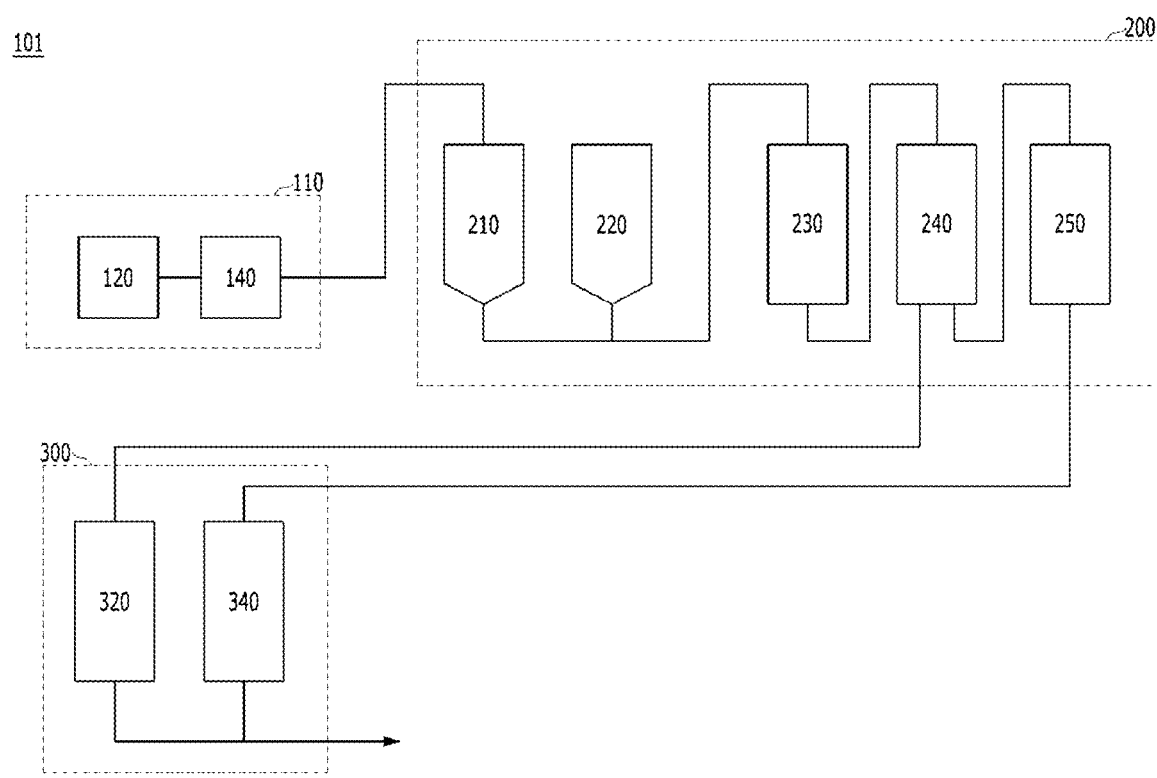
FIG. 1 is a schematic diagram showing a process flow of a dry manufacturing apparatus for recycled leather according to the present invention.
Figure 2:
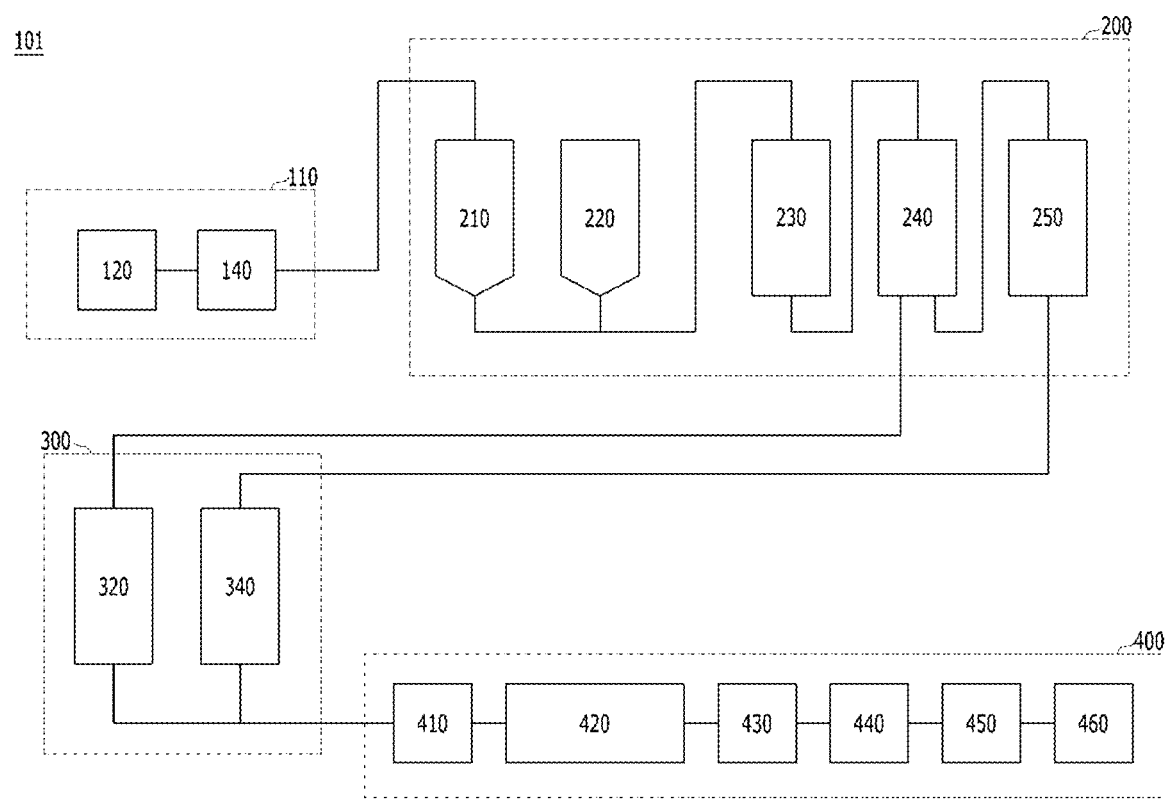
FIG. 2 is a diagram showing a specific process flow of the dry manufacturing apparatus for recycled leather according to the present invention.

In an embodiment of the present invention, the two airlaid machines 320 and 340 are shown in FIGS. 1 and 2, but of course, the number of airlaid machines may be greater than the two airlaid machines 320 and 340. The blended leather fibers and general fibers are fed to upper portions of the airlaid machines 320 and 340, and they are molded on the lower portions of the airlaid machines 320 and 340. That is, the airlaid machines 320 and 340 serve to mold the leather fibers and general fibers blended in the blending unit 200.

In an embodiment of the present invention, the airlaid machines 320 and 340 each include rollers, an air supplier, and/or a mixer, desirably rollers and an air supplier. The airlaid machines 320 and 340 perform the process corresponding to existing carding to allow the leather fibers and general fibers with a short form fed to the upper portions thereof to be entangled with one another and thus molded to the recycled leather with a long form, and accordingly, it is important to allow the leather fibers and the general fibers to be entangled with one another for long time. Because of the heavy properties of the leather fibers, however, the leather fibers and the general fibers may be dropped into the lower portions of the airlaid machines 320 and 340 before they are sufficiently entangled with one another. Through the air suppliers, accordingly, air is blown to the lower portions of the airlaid machines 320 and 340 to allow the drop time of the leather fibers and the general fibers to be extended, and the rollers each have protrusions formed on the surface thereof.

In an embodiment of the present invention, the drop speeds of the leather fibers and the general fibers to the lower portions of the airlaid machines 320 and 340 from the upper portions thereof are in the range of 10 to 500 m/min, desirably 10 to 300 m/min, more desirably 10 to 100 m/min. Since the drop speeds of the leather fibers and the general fibers are slow, accordingly, the leather fibers and the general fibers are sufficiently entangled with one another and thus molded to the recycled leather.

In an embodiment of the present invention, the molded leather fibers and general fibers discharged from the lower portions of the airlaid machines 320 and 340 are stacked on conveyor belts, and the conveyor belts are connected to each other. Of course, the molded leather fibers and general fibers discharged from any one of the airlaid machines 320 and 340 may be moved sequentially to the other airlaid machine 320 or 340 through the conveyor belts, and next, the moved leather fibers and general fibers are stacked sequentially onto the molded leather fibers and general fibers discharged from the other airlaid machine 320 or 340. Referring to FIGS. 1 and 2, for example, if the two airlaid machines 320 and 340 are provided, the leather fibers and general fibers molded through one airlaid machine 320 are moved to the other airlaid machine 340 through the conveyor belts, and next, the molded leather fibers and general fibers discharged from the lower portion of the other airlaid machine 340 is stacked on the moved leather fibers and general fibers. As shown in FIGS. 1 and 2, just two airlaid machines 320 and 340 are provided, but of course, two or more airlaid machines 320 and 340 may be provided. However, if the number of airlaid machines is less than two, the manufactured recycled leather may be torn and have irregular thicknesses.

In an embodiment of the present invention, the molded leather fibers and general fibers have a thickness of 2 to 3 cm, and a laminated body of the molded leather fibers and general fibers, each layer of which has the thickness as mentioned above, is compressed against rollers, together with other additives.

In an embodiment of the present invention, the dry manufacturing apparatus 101 for recycled leather further includes a post-processing unit 400 for performing the post-processing for the molded leather fibers and general fibers.

In an embodiment of the present invention, the post-processing unit 400 includes a pre-heater 410, a press machine 420, a cooler 430, a calendar machine 440, a buffing machine 450, and a winder 460. Of course, each component of the post-processing unit 400 may be provided plurally, and otherwise, only some of the components thereof may be provided.

In an embodiment of the present invention, the pre-heater 410 serves to apply low-temperature heat to the molded leather fibers and general fibers before the molded leather fibers and general fibers are moved to the press machine 420 operating at a high temperature. As the low-temperature heat is applied to the molded leather fibers and general fibers, the heat can be deeply transmitted to the molded leather fibers and general fibers moved to the press machine 420 operating at a high temperature, thereby allowing the fibers to be well coupled to one another.

In an embodiment of the present invention, the press machine 420 serves to compressedly heat the molded leather fibers and general fibers to thus enhance bonding among the molded leather fibers and general fibers, and the press machine 420 has a temperature of 50 to 250° C. Of course, a plurality of press machines 420 may be provided.

In an embodiment of the present invention, the cooler 430 serves to cool the molded leather fibers and general fibers coupled by the heat applied from the press machine 420 by means of a refrigerant. Further, the calendar machine 440 serves to compress the recycled leather to a given thickness to maintain the smoothness of the recycled leather, and the buffing machine 450 serves to perform napping on the surface of the recycled leather. Also, the winder 460 serves to wind up the recycled leather to a given unit, while side cutting for the recycled leather is being performed.

In an embodiment of the present invention, the dry manufacturing apparatus 101 for recycled leather does not use water. That is, the conventional recycled leather manufacturing apparatus uses a very large amount of water, thereby undesirably increasing economical load, but the dry manufacturing apparatus 101 for recycled leather according to the present invention can manufacture the recycled leather, without using any water, thereby achieving the reduction of manufacturing cost.

In an embodiment of the present invention, the leather waste indicates all types of leather waste that are not reused, excepting the existing shaving scraps, and for example, the leather waste includes cut waste (industrial waste) produced by cutting unmarketable portions having neck wrinkles, scars, and the like generated during leather processing in general leather production plants, waste after the leather products are cut, and municipal leather waste collected by separating only the leather of leather waste products.

According to a second aspect of the present invention, there is provided a dry manufacturing method for recycled leather including the steps of: separating leather fibers from leather waste; blending the separated leather fibers with general fibers; and molding the blended leather fibers and general fibers to the recycled leather, wherein the molding step is carried out to mold the blended leather fibers and general fibers through airlaid processes.

A specific explanation of the corresponding parts to the parts as described according to the first aspect of the present invention will be avoided, but the description according to the first aspect of the present invention may be applied in the same manner as above to that according to the second aspect of the present invention even if not suggested herein.

Hereinafter, a dry manufacturing method for recycled leather according to the second aspect of the present invention will be specifically described.

In an embodiment of the present invention, the dry manufacturing method for recycled leather includes the step of separating leather fibers from leather waste.

In an embodiment of the present invention, the step of separating leather fibers from leather waste is carried out by separating only leather fibers from leather waste, and particularly includes the steps of: breaking bonding among the leather fibers of the leather waste; and separating the leather fibers from the leather waste in which the bonding among the leather fibers is broken.

In an embodiment of the present invention, next, the dry manufacturing method for recycled leather includes the step of blending the separated leather fibers with general fibers.

In an embodiment of the present invention, the step of blending the separated leather fibers with general fibers is carried out by blending the separated leather fibers with general fibers so as to manufacture the recycled leather. In this case, the general fibers are filaments or staple fibers. If the general fibers are filaments, the manufactured recycled leather has strong durability, and if the general fibers are staple fibers, the manufactured recycled leather becomes soft.

In an embodiment of the present invention, an anti-static agent and/or oils and fats are added to allow the blending to be more gently carried out. Only if the anti-static agent serves to perform an anti-static function, it is not limited particularly in kind thereof, and the oils and fats may be freely selected from animal and vegetable oils and fats.

In an embodiment of the present invention, the general fibers blended with the leather fibers are present in an amount within the range of 5 to 40 parts by weight, desirably within the range of 10 to 30 parts by weight, with respect to 100 parts by weight of the leather fibers. If the content of the general fibers is less than 5 parts by weight with respect to 100 parts by weight of the leather fibers, the general fibers are not blended well with the leather fibers due to a small amount thereof, and contrarily, if the content of the general fibers is greater than 40 parts by weight with respect to 100 parts by weight of the leather fibers, the recycled leather manufactured cannot exhibit leather textures well due to a large amount thereof.

In an embodiment of the present invention, the blending is carried out through first blending and second blending. The first blending serves to blend the leather fibers with the general fibers through a mixer, and the second blending serve to blow air thereinto through fine openers to blend the leather fibers with the general fibers. The leather fibers and general fibers blended through the first blending are consistently blended through the second blending.

In an embodiment of the present invention, the second blending is carried out through the plurality of fine openers. First, 30 to 70% of the leather fibers and the general fibers are blended through the first blending, and next, 90 to 100% of the leather fibers and the general fibers are blended through the second blending.

In an embodiment of the present invention, next, the dry manufacturing method for recycled leather includes the step of molding the blended leather fibers and general fibers to the recycled leather.

In an embodiment of the present invention, the molding step is carried out to mold the blended leather fibers and general fibers through an airlaid machine(s).

In an embodiment of the present invention, the number of airlaid machines may be plurally provided. The blended leather fibers and general fibers are fed to upper portions of the airlaid machines, and they are molded on the lower portions of the airlaid machines. That is, the airlaid machines serve to mold the blended leather fibers and general fibers.

In an embodiment of the present invention, the airlaid machines each include rollers, an air supplier, and/or a mixer, desirably rollers and an air supplier. The airlaid machines perform the process corresponding to existing carding to allow the leather fibers and general fibers with a short form fed to the upper portions thereof to be entangled with one another and thus molded to the recycled leather with a long form, and accordingly, it is important to allow the leather fibers and the general fibers to be entangled with one another for long time. Because of the heavy properties of the leather fibers, however, the leather fibers and the general fibers may be dropped into the lower portions of the airlaid machines before they are sufficiently entangled with one another. Through the air suppliers, accordingly, air is blown to the lower portions of the airlaid machines to allow the drop time of the leather fibers and the general fibers to be extended, and the rollers each have protrusions formed on the surface thereof. Further, each roller has a rotational speed of 10 to 500 rpm.

In an embodiment of the present invention, since the drop speeds of the leather fibers and the general fibers are slow, accordingly, the leather fibers and the general fibers are sufficiently entangled with one another and thus molded to the recycled leather.

In an embodiment of the present invention, the molded leather fibers and general fibers discharged from the lower portions of the airlaid machines are stacked on conveyor belts, and the conveyor belts are connected to each other. Of course, the molded leather fibers and general fibers discharged from any one of the airlaid machines may be moved sequentially to the other airlaid machine through the conveyor belts, and next, the moved leather fibers and general fibers are stacked sequentially onto the molded leather fibers and general fibers discharged from the other airlaid machine.

In an embodiment of the present invention, the molded leather fibers and general fibers have a thickness of 2 to 3 cm, and a laminated body of the molded leather fibers and general fibers, each layer of which has the thickness as mentioned above, is compressed against rollers, together with other additives.

According to a third aspect of the present invention, there is provided recycled leather manufactured according to the dry manufacturing method for recycled leather according to the second aspect of the present invention.

A specific explanation of the corresponding parts to the parts as described according to the first and second aspects of the present invention will be avoided, but the description according to the first and second aspects of the present invention may be applied in the same manner as above to that according to the third aspect of the present invention even if not suggested herein.

Hereinafter, the recycled leather according to the third aspect of the present invention will be specifically described.

In an embodiment of the present invention, the recycled leather includes two or more layers of recycled leather with the leather fibers and the general fibers.

In an embodiment of the present invention, the recycled leather has a sectional shape of a web having no texture, and because there is no texture, the recycled leather has elongation of 20 to 80%, desirably 20 to 50%, more desirably 20 to 30%. Accordingly, the recycled leather can have the inherent properties the hard leather has, without stretching. Further, the recycled leather has a tensile strength of 5 to 20 $N/mm^2$. The reason why the recycled leather has a high tensile strength is because it has the sectional shape of the web having no texture and the high bonding force between the layers through strong fiber bonding. Accordingly, the recycled leather may be not easily damaged by external friction.

In an embodiment of the present invention, the recycled leather is not limited in shape, but for example, the recycled leather may have the shape of a sheet.

INDUSTRIAL APPLICABILITY

According to the present invention, the dry manufacturing apparatus for recycled leather can mold the blended leather fibers and general fibers through the airlaid machines, thereby requiring no conventional carding. Further, the recycled leather molded through the airlaid machines does not have any texture because no carding is applied, and accordingly, the recycled leather has low elongation, so that it has the inherent properties the hard leather has, without stretching.

In addition, the dry manufacturing apparatus for recycled leather is provided with the plurality of airlaid machines, so that the molded leather fibers and general fibers are stacked on another molded leather fibers and general fibers, and further, the recycled leather has a high bonding force between the layers through strong fiber bonding, thereby increasing the tensile strength or tear strength thereof.

Moreover, the dry manufacturing apparatus for recycled leather can manufacture the recycled leather in a dry manner, without using any water, unlike the conventional recycled leather manufacturing apparatus using a very large amount of water, thereby achieving the reduction of manufacturing cost.

The effects of the invention are not limited as mentioned above, and it should be understood that the effects of the invention include all effects inferable from the detailed description and claims of the present invention.

The invention claimed is:

1. A dry manufacturing apparatus for recycled leather, comprising:
   a leather fiber separator configured to separate leather fibers from leather waste;
   a blender configured to blend the leather fibers with general fibers; and
   a molder configured to mold the leather fibers and general fibers to the recycled leather,
   wherein the molder has an airlaid machine configured to mold the leather fibers and general fibers, wherein the general fibers include filaments or staple fibers, wherein the airlaid machine has a plurality of airlaid machines, wherein upper portions of the plurality of airlaid machines are configured to be fed with the leather fibers and the general fibers that are blended, and lower portions of the plurality of airlaid machines are configured to mold the leather fibers and the general fibers that drop from the upper portions, and wherein the plurality of airlaid machines has air suppliers configured to blow air to the lower portions of the plurality of airlaid machines to allow a drop time of the leather fibers and the general fibers to be extended.

2. The dry manufacturing apparatus according to claim 1, wherein the leather fiber separator comprises:
a leather crusher configured to break bonding among the leather fibers of the leather waste; and
a leather scutcher configured to separate the leather fibers from the leather waste.

3. The dry manufacturing apparatus according to claim 1, wherein the blender comprises:
a leather fiber injector configured to inject the leather fibers;
a general fiber injector configured to inject the general fibers;
a leather fiber weight measurer configured to measure a weight of the leather fibers injected through the leather fiber injector;
a general fiber weight measurer configured to measure a weight of the general fibers injected through the general fiber injector; and
a leather fiber and general fiber blender configured to blend the leather fibers and the general fibers,
wherein the leather fiber weight measurer is connected to the general fiber weight measurer by a conveyor belt,
wherein the conveyor belt is configured to move the leather fibers injected into the leather fiber weight measurer to the general fiber weight measurer, and
wherein the general fiber injector is configured to inject the general fibers having a predetermined weight with respect to the weight of the leather fibers measured through the leather fiber weight measurer into the general fiber weight measurer.

4. The dry manufacturing apparatus according to claim 3, wherein the general fiber injector is configured to inject the general fibers into the general fiber weight measurer in an amount within a range of 5 to 40 parts by weight with respect to 100 parts by weight of the leather fibers injected into the leather fiber weight measurer.

5. The dry manufacturing apparatus according to claim 3, wherein the leather fiber and general fiber blender comprises a first leather fiber and general fiber blender and a second leather fiber and general fiber blender, wherein the first leather fiber and general fiber blender has a mixer configured to blend the leather fibers with the general fibers for a first time and wherein the second leather fiber and general fiber blender has a fine opener configured to blow air to blend the leather fibers with the general fibers for a second time.

6. The dry manufacturing apparatus according to claim 5, wherein the second leather fiber and general fiber blender has a plurality of fine openers, wherein the first leather fiber and general fiber blender is configured to blend 30 to 70% of the leather fibers and the general fibers and wherein the second leather fiber and general fiber blender is configured to blend 90 to 100% of the leather fibers and the general fibers.

7. The dry manufacturing apparatus according to claim 1, wherein each of the plurality of airlaid machines comprises rollers, an air supplier, and/or a mixer.

8. The dry manufacturing apparatus according to claim 1, wherein drop speeds of the leather fibers and the general fibers to the lower portions from the upper portions of the plurality of airlaid machines are in a range of 10 to 500 m/min.

9. The dry manufacturing apparatus according to claim 1, wherein the lower portions of the plurality of airlaid machines are configured to discharge and stack molded leather fibers and general fibers on conveyor belts, wherein the conveyor belts are connected to each other to move the molded leather fibers and general fibers discharged from one of the plurality of airlaid machines sequentially to another of the plurality of airlaid machines and wherein the another of the plurality of airlaid machines is configured to discharge and stack another molded leather fibers and general fibers sequentially onto the molded leather fibers and general fibers discharged from the one of the plurality of airlaid machines.

10. The dry manufacturing apparatus according to claim 1, further comprising a pressor configured to compress the recycled leather, together with heat.

11. The dry manufacturing apparatus according to claim 1, wherein the dry manufacturing apparatus is configured to manufacture the recycled leather without water.

12. A dry manufacturing method for recycled leather, comprising:
separating leather fibers from leather waste;
blending the leather fibers with general fibers; and
molding the leather fibers and general fibers that are blended to the recycled leather,
wherein the molding is carried out through an airlaid machine,
wherein the general fibers include filaments or staple fibers,
wherein the airlaid machine has a plurality of airlaid machines, wherein upper portions of the plurality of airlaid machines are fed with the leather fibers and the general fibers that are blended, and the leather fibers and the general fibers that drop from the upper portions are molded in lower portions of the plurality of airlaid machines, and
wherein the plurality of airlaid machines has air suppliers, wherein air is blown to the lower portions of the plurality of airlaid machines by the air suppliers to allow a drop time of the leather fibers and the general fibers to be extended.

* * * * *